2,712,560

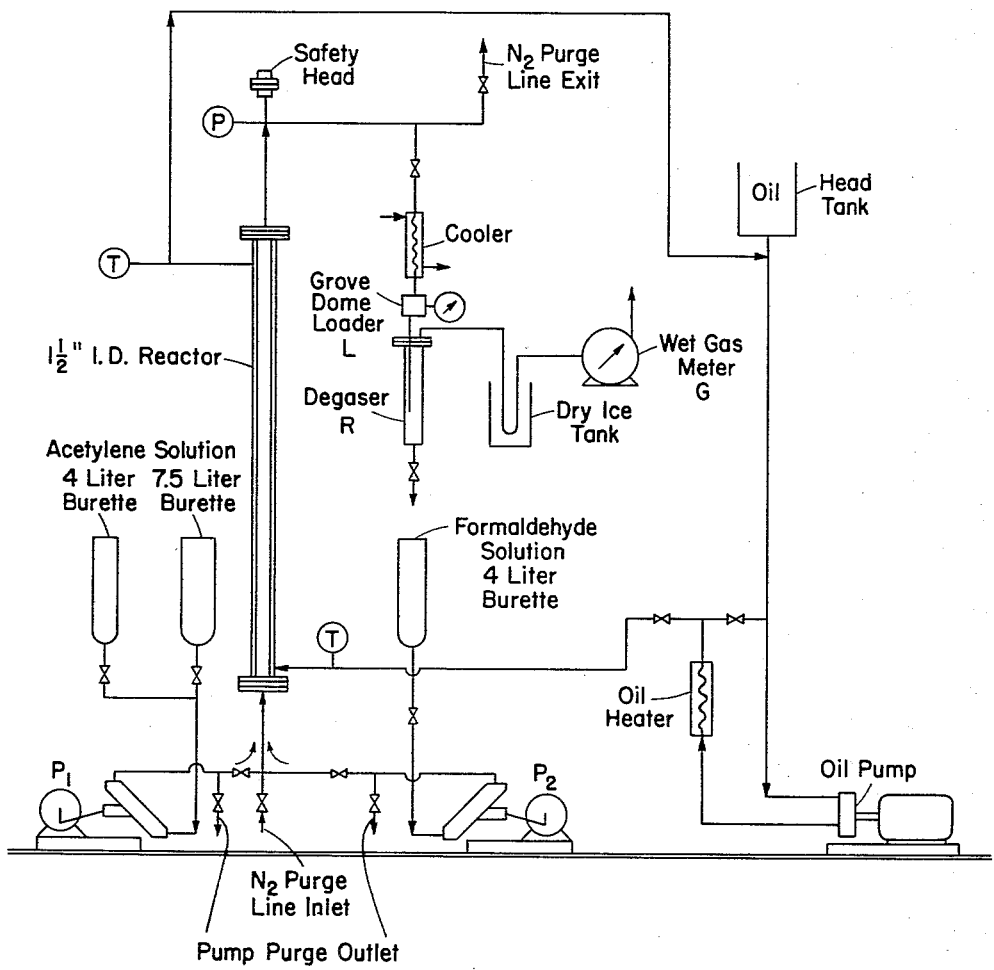

ETHYNYLATION PROCESS FOR PRODUCTION OF ALKYNOLS FROM SOLVATED ACETYLENE

Clyde McKinley, Belvidere, and Frederick Fahnoe, Morristown, N. J., and Donald Leask Fuller, Easton, Pa., assignors to General Aniline & Film Corporation, New York, N. Y., a corporation of Delaware Application December 28, 1949, Serial No. 135,422

7 Claims. (Cl. 260—635)

This invention relates to the production of alkynols by ethynylation reactions, i. e., the introduction of acetylene into a reaction to yield a product containing a triple bond.

In accordance with the well known process for the production of alkynols described in U. S. Patent No. 2,232,867, alkynols are prepared by reacting aldehydes or ketones with acetylene hydrocarbons of the general formula $$R-C\equiv CH$$

wherein R represents hydrogen or the radical of a hydrocarbon, such as methyl, vinyl, and phenyl radicals. The acetylene or acetylene hydrocarbon is introduced into the reactor as a gas, while the aldehyde or ketone may be itself a liquid under reaction conditions, or may be present in a liquid solvent or diluent.

The reaction proceeds at moderately elevated temperatures of from 50 to 150° C. and is generally carried out at superatmospheric pressures of low range. Pressures of from 2 to 30 atmospheres are mentioned in the aforesaid patent. Experience, however, has shown that a suitable safe pressure for compressed gaseous acetylene is in the range of from 5 to 10 atmospheres and with careful control of the temperature. When it is desired to increase the pressure, the acetylene gas is diluted with inert gases or vapors, e. g., nitrogen, hydrogen, or carbon dioxide.

Now it has been found that the catalytic ethynylation reaction of acetylene or acetylene hydrocarbons and aldehydes or ketones may be carried out entirely in the liquid phase and at greatly increased pressures by introducing the acetylene dissolved in a suitable liquid phase solvent into the reactor containing the aldehyde or ketone, also in the liquid phase. The reactant acetylene is thus introduced into the reaction mixture as a liquid solution and is maintained entirely in the solvated form throughout the course of the reaction.

In carrying out this process, acetylene gas at the maximum safe compressor pressure of from 200 to 250 pounds per square inch is introduced into a suitable preferential solvent in which the acetylene or acetylene hydrocarbon has a high solubility, e. g., acetone, propargyl alcohol, tetrahydrofuran, and dioxan, so that concentrations of 20 to 30% by weight of the acetylene in the solvent are obtained at room temperature. This solution is then pumped into an ethynylation reactor where it contacts and mixes with a separately pumped aqueous solution of the aldehyde, e. g., formaldehyde, acetaldehyde, and benzaldehyde, or the ketone, e. g., acetone, methyl ethyl ketone, and acetophenone. The ethynylation synthesis of acetylenic alkynols and/or diols takes place in contact with a typical ethynylation catalyst, such as copper acetylide deposited on silica gel, prepared as described in U. S. Patent No. 2,232,867. The reactor pressure is maintained at a pressure sufficient to retain the acetylene completely in solution at the reaction temperature employed. This pressure will be considerably above the existing 200 to 250 p. s. i. pressure on the suction side of the acetylene pump due to both the dilution of the preferential solvent with water and the temperature increase.

The provision of this initial loading of the liquid filled system so as to preclude the formation of any gaseous phase over the reactant mixture and the maintenance of the reaction mixture in the solvated form permits of the use of pressures such as 2,000 p. s. i. in suitably designed reactors. Previous processes have been limited in the pressures employed, as indicated above, by the maximum safe pressure of acetylene when present in the gas phase at any point in the reactor. It has been determined that acetylene solutions in acetone and mixtures of acetone and water containing up to 40% by weight acetylene are not detonated by a spark or a fused wire provided no gas phase is present. Pumping such solutions at pressures of 2,000 p. s. i. presents no difficulty providing proper provisions are made to preclude the formation of any gas phase.

The reactions which may be carried out in accordance with this completely liquid phase ethynylation are represented as follows:

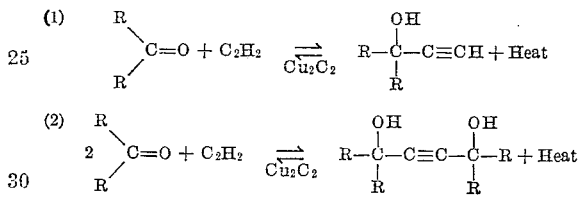

wherein R is hydrogen or any alkyl or aryl grouping such as methyl, ethyl and phenyl. The extent of the reaction will depend, among other factors, upon the relative concentration of the reactants. An excess of acetylene will favor reaction No. 1, forming mono-substituted alkynols, while an excess of carbonyl will favor reaction No. 2, forming di-substituted alkynols. In previous ethynylation reactions where a gaseous acetylene phase is present the concentration of acetylene in the liquid phase is limited to a very narrow range of from 0 to 4% by weight because of the reaction temperature and the necessarily low gas pressures employed. As a result, little flexibility of the ratio of reactant concentrations can be obtained. When operating entirely in the liquid phase in accordance with this process, the acetylene concentration can be varied from 0 to 20% by weight or even higher, permitting a great deal of flexibility in the ratio of reactant concentrations. As a result, a controllable variation in the yield ratio of mono- and di-substituted alkynol products may be maintained.

The ethynylation processes involving gaseous acetylene or acetylene hydrocarbons cannot be conducted with fluidization technique and the use of large catalyst particles in fixed beds must be observed. The ease of adaptation of the new liquid phase reaction to fluidization techniques permits of employing smaller catalyst particles which will fluidize in the liquid reactant stream. Other obvious advantages in the fluidization technique include ease of design for heat transfer, which is of considerable advantage since ethynylation is an exothermic reaction and fixed bed operations are difficult to control when a gas phase is present. Use of smaller catalyst particles (30 to 80 mesh) also permits more active surface areas and a greater reaction rate. The fluidization technique also permits easy regeneration and replenishment of the catalyst by recycling.

In the previous gaseous or heterogeneous phase reaction of acetylene or acetylene hydrocarbons and aldehydes or ketones, the process reaction rates were very slow since low reaction temperatures of from 100 to 125° C. had to be observed to prevent local overheating of the fixed catalyst bed. When using the fluidization technique possible under the entirely liquid reaction conditions of this process, local overheating is avoided and higher reaction temperatures of from 100 to 200° C. are possible by adjusting the applied pressure to the reactor so as to maintain the acetylene or acetylene hydrocarbon in a solvated or dissolved state throughout.

The following example, which is described in conjunction with the apparatus diagrammatically illustrated in the accompanying drawing, will serve to further illustrate the liquid phase ethynylation process with solvated acetylene or an acetylene hydrocarbon.

*Example*

Acetylene solution in acetone (24% by weight, pressure 240 p. s. i. at 20° C.) is introduced into a proportioning pump, P–1, from the 4 and 7.5 liter burettes shown leading into said pump, P–1. Formaldehyde solution in water is introduced into proportioning pump, P–2, from the 4 liter burette shown leading into said pump, P–2.

The two reactant streams from proportioning pumps P–1 and P–2 are combined in a tee and enter concurrently upward into a fixed bed ethynylation reactor consisting of a 1½″ I. D. stainless steel tube, 4′0″ long, packed with pellets of a typical copper acetylide catalyst deposited on silica gel.

The reactor is jacketed and the reactor jacket temperature is controlled as desired by a circulating hot oil system. The effluent from the reactor passes through a pressure loader, L, the liquid reaction products are collected in the degasser, R, and analyzed while the unreacted acetylene is vented through a gas meter, G.

The pressure maintained by the pressure loader was 1,000 p. s. i., a value greater than the partial pressure of acetylene over the reaction mixtures employed in any of the runs. The pH of the reaction mixture was maintained at about 4.0 by adjustment of the formaldehyde solutions.

The results of three runs in accordance with this example are indicated in the following table:

as novel and desire to protect by Letters Patent is as follows:

1. A process for the production of alkynols which comprises reacting in the absence of a vapor phase a member of the group consisting of aldehydes and ketones with an acetylenic hydrocarbon corresponding to the formula $$R-C\equiv CH$$

wherein R is a member of the group consisting of hydrogen and hydrocarbon radicals, said acetylenic hydrocarbon being dissolved in a preferential liquid solvent and all of the reactants being in the liquid phase, in the presence of an ethynylation catalyst, at a temperature higher than 20° C. and a pressure created by a liquid pump sufficient to maintain the acetylene hydrocarbon in the reaction mixture in the liquid phase.

2. A process of claim 1 wherein the pressure is higher than 250 pounds per square inch.

3. A process of claim 2 wherein the concentration of the acetylenic hydrocarbon in the liquid phase is in the range of above zero up to 20% by weight.

4. A process of claim 2 wherein the solvent is acetone.

5. A process of claim 4 wherein one reactant is a solution of formaldehyde in water, the catalyst is copper acetylide, the temperature is in the range of 95 to 125° C., and the pressure is about 1,000 pounds per square inch.

6. A process of claim 2 wherein the solvent is tetrahydrofuran.

7. A process of claim 2 wherein the solvent is dioxan.

References Cited in the file of this patent
UNITED STATES PATENTS

| | | |
|---|---|---|
| 2,232,867 | Reppe et al. | Feb. 25, 1941 |
| 2,302,345 | Pesta et al. | Nov. 17, 1942 |
| 2,487,009 | Londergan | Nov. 1, 1949 |

OTHER REFERENCES

Seguin: Bull. Soc. Chim., vol. 12, pp. 948–9 (1945).

[Pressure—1,000 p. s. i.; contact time—.25 hr.]

| Run No. | Temp., °C. | $CH_2O$, g. mols/hr. | $C_2H_2$, g. mols/hr. | Mol Ratio, $CH_2O/C_2H_2$ | g. mols/hr. Propargyl Alcohol | Product Butynediol | Ratio:—mols $CH_2O$ in Butynediol/ mols $CH_2O$ in Propargyl Alcohol | Percent $CH_2O$ Converted | Percent $C_2H_2$ Converted |
|---|---|---|---|---|---|---|---|---|---|
| 1 | 95 | 3.3 | 1.98 | 1.67 | .13 | .29 | 4.45 | 22.0 | 21.2 |
| 2 | 125 | 3.3 | 1.98 | 1.67 | .48 | .23 | 0.96 | 28.5 | 35.7 |
| 3 | 125 | 1.6 | 1.98 | .8 | .60 | .12 | 0.13 | 52.5 | 36.3 |

Having now described our invention and having illustrated the best manner of performing it, what we claim

Reppe: "Acetylene Chemistry," translation of P. B. Report 18852-s by Chas. A. Meyer Co., page 101 (1949).